United States Patent
Aiki et al.

(10) Patent No.: US 7,341,188 B2
(45) Date of Patent: Mar. 11, 2008

(54) POSITION DETECTION SYSTEM, GAME SYSTEM, AND CONTROL METHOD FOR POSITION DETECTION SYSTEM

(75) Inventors: Shinichiro Aiki, Kanagawa (JP); Koji Kawashima, Kawasaki (JP); Sunao Haga, Tokyo (JP); Kazuya Kuwasawa, Yokohama (JP); Masayuki Kikuchi, Yokohama (JP)

(73) Assignee: NAMCO BANDAI Games Inc., Tokyo (JP)

( * ) Notice: Subject to any disclaimer, the term of this patent is extended or adjusted under 35 U.S.C. 154(b) by 193 days.

(21) Appl. No.: 11/090,591

(22) Filed: Mar. 28, 2005

(65) Prior Publication Data

US 2005/0224582 A1 Oct. 13, 2005

(30) Foreign Application Priority Data

Mar. 31, 2004 (JP) .............................. 2004-105633

(51) Int. Cl.
*G06K 7/10* (2006.01)
(52) U.S. Cl. ...................... 235/454; 235/455; 235/459; 463/1; 463/50
(58) Field of Classification Search ................. 463/50, 463/53, 1; 235/455, 457, 459–461
See application file for complete search history.

(56) References Cited

U.S. PATENT DOCUMENTS 3,960,380 A * 6/1976 Yokoi .......................... 463/50

RE32,662 E * 5/1988 Pennington ................. 463/52
5,884,239 A 3/1999 Romanik, Jr.

FOREIGN PATENT DOCUMENTS

| GB | 2 324 691 A | 10/1998 |
|---|---|---|
| JP | A 2-71252 | 3/1990 |
| JP | A 2-134182 | 5/1990 |
| JP | A 8-117448 | 5/1996 |
| RU | 1 235 293 A1 | 10/1995 |
| RU | 1 376 706 A1 | 10/1995 |
| WO | WO 03/017188 A2 * | 2/2003 |

* cited by examiner

*Primary Examiner*—Seung Ho Lee
(74) *Attorney, Agent, or Firm*—Oliff & Berridge, PLC (57) ABSTRACT

A position detection system includes: a scan beam illumination section which causes a first-direction line-shaped scan beam that is parallel to the X-axis to scan in the Y-axis direction at a predetermined scanning speed, then causes a second-direction line-shaped scan beam that is parallel to the Y-axis to scan in the X-axis direction at a predetermined scanning speed; a light-receiving section which detects the timings at which the first and second-direction line-shaped scan beams pass through a pointing position on a screen; and a position calculation section which calculates the pointing position by a pointing device on the screen, based on the time from the start of scanning of the first-direction line-shaped scan beam until the passage thereof through the pointing position is detected and the time from the start of scanning of the second-direction line-shaped scan beam until the passage thereof through the pointing position is detected.

24 Claims, 8 Drawing Sheets

POSITION DETECTION SYSTEM, GAME SYSTEM, AND CONTROL METHOD FOR POSITION DETECTION SYSTEM

Japanese Patent Application No. 2004-105633, filed on Mar. 31, 2004, is hereby incorporated by reference in its entirety.

BACKGROUND OF THE INVENTION

The present invention relates to a position detection system, a game system, and a control method for a position detection system.

A shooting game device that is known in the art enables a plater to use a gun-shaped controller to enjoy simulated shooting.

Game devices that are formed to enable players to use guns to shoot at targets on a screen have become widely popular. In such a game device, a display screen such as a CRT is provided at a predetermined position on a casing, and targets appear on the screen sequentially in accordance with the calculations of a predetermined game program. When a player uses a gun-shaped controller to aim at one of these targets and pulls the trigger, the position at which the gun-shaped controller is aiming is detected by using a position detection circuit and, if that position matches the position of the target, the bullet is determined to have hit that target and a score corresponding to that target is displayed.

It is known in the art to provide a game device that enables shooting at targets displayed on a screen, but without actually firing bullets from such a gun-shaped controller, in which the gun-shaped controller is installed in a holding device that can change the orientation of the gun within fixed angles vertically and horizontally. The orientation of the gun is detected by an encoder or the like that is provided in that holding device. However, since the gun cannot be removed from that holding device for play, a problem arises in that the reality of the game is greatly damaged.

In a known shooting game device that enables play with the gun-shaped controller held freely in the hand, instead of being installed in a holding device, a light-receiving element is provided in the nozzle of the gun-shaped controller. At the same time that the player pulls the trigger of the gun-shaped controller, the screen switches from the game screen to a white screen for position detection, and a raster scan of the white screen starts from a starting point of the top-left corner of the screen. At the same time that the raster scan of the nozzle direction of the gun-shaped controller is performed, the light-receiving element provided in the gun-shaped controller detects light from the raster scan screen, and that raster scan position is detected as the shot position.

The above-described method enables the player to hold the gun freely while playing the game, but since the game screen switches momentarily to a white screen when the player pulls the trigger of the gun-shaped controller, flickering of the game screen occurs every time the trigger of the gun-shaped controller is pulled, which causes a problem in that it leads to tired eyes. Since this change in the screen occurs every time a trigger is pulled, this is particularly irritating when the game is being played by a plurality of players, which leads to a problem in that it kills the players' interest in the game.

SUMMARY

A first aspect of the present invention relates to a position detection system which detects a pointing position of a pointing device on a surface to be detected; the position detection system comprising:

a scan beam illumination section which shines a line-shaped scan beam onto the surface to be detected, and scans the line-shaped scan beam at a predetermined speed in two different directions on the surface to be detected;

a light-receiving section which detects the line-shaped scan beam reflected from the surface to be detected; and a position calculation section which calculates the pointing position on the surface to be detected, based on a time from start of scanning of the line-shaped scan beam that scans in a first direction of the surface to be detected until the light-receiving section detects the line-shaped scan beam, and a time from start of scanning of the line-shaped scan beam that scans in a second direction of the surface to be detected until the light-receiving section detects the line-shaped scan beam.

A second aspect of the invention relates to a game system comprising:

the above position detection system;

a game processing section which performs processing based on a pointing position on the surface to be detected that has been calculated by the position detection system; and an image generation system which generates an image to be displayed on the surface to be detected, based on processing results of the game processing section, wherein the pointing device is configured as a shooting device which resembles a gun, and wherein the game processing section performs a shooting calculation or a hit-check calculation based on the pointing position on the surface to be detected that has been detected by the position detection system.

A third aspect of the invention relates to a control method for a position detection system which detects a pointing position of a pointing device on a surface to be detected; the control method comprising:

shining a line-shaped scan beam onto the surface to be detected, and scanning the line-shaped scan beam at a predetermined speed in two different directions on the surface to be detected;

detecting the line-shaped scan beam reflected from the surface to be detected; and calculating the pointing position on the surface to be detected, based on a time from start of scanning of the line-shaped scan beam that scans in a first direction of the surface to be detected until the light-receiving section detects the line-shaped scan beam, and a time from start of scanning of the line-shaped scan beam that scans in a second direction of the surface to be detected until the light-receiving section detects the line-shaped scan beam.

DETAILED DESCRIPTION OF THE EMBODIMENT

The present invention was devised in light of the above-described technical problem and may provide a position detection system, a game system, and a control method for a position detection system which enable a user to play a game while freely hold a pointing device, and which do not cause any flickering due to flashes.

An embodiment of the invention provides a position detection system which detects a pointing position of a pointing device on a surface to be detected; the position detection system comprising:

a scan beam illumination section which shines a line-shaped scan beam onto the surface to be detected, and scans the line-shaped scan beam at a predetermined speed in two different directions on the surface to be detected;

a light-receiving section which detects the line-shaped scan beam reflected from the surface to be detected; and a position calculation section which calculates the pointing position on the surface to be detected, based on a time from start of scanning of the line-shaped scan beam that scans in a first direction of the surface to be detected until the light-receiving section detects the line-shaped scan beam, and a time from start of scanning of the line-shaped scan beam that scans in a second direction of the surface to be detected until the light-receiving section detects the line-shaped scan beam.

The pointing device could be any object that indicates a position on the surface to be detected, such as a shooting device in the form of a gun-shaped controller.

In this case, the line-shaped scan beam preferably uses light of a predetermined wavelength that is outside the visible range, such as infrared.

The surface to be detected could be a surface, position of which can be specified by axial coordinates in two different directions on the surface to be detected, such as an X-axis and a Y-axis crossing the X-axis at right angle, for example, a screen (CRT, display, or liquid crystal screen) on which game images (background images and targets) are displayed or it could be a screen on which images are projected by a projector or the like, or it could even he a wall or floor. The surface to be detected could also be a surface on which no images or the like are displayed.

The scan beam illumination section can be configured in such a manner that the first and second-direction line-shaped scan beams scan in the vertical direction at a predetermined speed of approximately 1/60 seconds, by way of example, from the upper edge of the screen to the lower edge thereof (or in the opposite direction), and subsequently scan in the lateral direction from the left edge to the right edge (or in the opposite direction). Note that it is not necessary for the scanning speeds of the first-direction line-shaped scan beam and second-direction line-shaped scan beam to be the same, and the scanning speeds may be speeds that are recognized by the system and are sufficient for position detection.

The light-receiving section is configured of a light-receiving element that can detect light of the wavelength of each line-shaped scan beam, which detects the timing at which the light from the point direction of the pointing device is received and the line-shaped scan beam that scans the screen passes through the pointing position.

Since the first-direction line-shaped scan beam scans in the Y-axis direction on the screen at a predetermined speed, the pointing position of the line-shaped scan beam with respect to the Y-axis direction (the coordinate thereof in the Y-axis direction) can be obtained if the position and timing at which the scanning of the first-direction line-shaped scan beam starts and the timing at which it passes through the pointing position can be determined. Similarly, since the second-direction line-shaped scan beam scans in the X-axis direction on the screen at a predetermined speed, the pointing position of the line-shaped scan beam with respect to the X-axis direction (the coordinate thereof in the X-axis direction) can be obtained if the position and timing at which the scanning of the second-direction line-shaped scan beam starts and the timing at which it passes through the pointing position can be determined.

The position calculation section can therefore calculate the pointing position of the pointing device, based on the time from the start of scanning in the X-axis direction to the detection of the passage of the first-direction line-shaped scan beam through the pointing position and the time from the start of scanning in the Y-axis direction (at the edge of the target area or screen) to the detection of the passage of the second-direction line-shaped scan beam through the pointing position, by acquiring the timing of the start of scanning in the X-axis direction, from scan control information or the like from the scan beam illumination section, and the timing of the detection of the line-shaped scan beam through the pointing position, from detection information from the light-receiving section.

With this position detection system, the scan beam illumination section may have a light generation section which generates light of different frequencies as the line-shaped scan beam in the first direction and the line-shaped scan beam in the second direction, and the light-receiving section may have a filter which passes the line-shaped scan beam in the first direction, another filter which passes the line-shaped scan beam in the second direction, and a sensor which receives light that has passed through each of the filters.

The device is provided with a filter that passes the line-shaped scan beam in the first direction, another filter that passes the line-shaped scan beam in the second direction, and a sensor that receives the light that has passed through each filter.

With this position detection system, the scan beam illumination section may have a light generation section which generates light of different frequencies as the line-shaped scan beam in the first direction and the line-shaped scan beam in the second direction, and the light-receiving section may have a recognition section which recognizes a scan direction of the line-shaped scan beam that is received, based on the frequency of light that is received thereby With this position detection system, when a predetermined pointing event has occurred, the position calculation section may calculate the pointing position of the pointing device on the surface to be detected, based on a time from start of scanning of the first-direction line-shaped scan beam until passage of scanning through the pointing position is detected and a time from start of scanning of the second-direction line-shaped scan beam until passage of scanning through the pointing position is detected.

The predetermined pointing event is an input that specifies pointing timing and is equivalent to a trigger input when the pointing device is a shooting device, by way of example.

The position detection system of this embodiment can perform the position detection at a regular timing or an arbitrary timing, but it could also be configured in such a manner that the position on the surface to be detected that the pointing device is pointing at is calculated only when a predetermined pointing event has occurred.

With this position detection system, the scan beam illumination section may start illumination of the line-shaped scan beam at a timing at which a predetermined pointing event occurs.

With this position detection system, the scan beam illumination section may include:

an infrared laser beam generation section which generates an infrared laser beam;

a section which causes the infrared laser beam to be reflected in a rotating polygon mirror to change a direction of the infrared laser beam continuously;

an optical system which causes the infrared laser beam reflected in the polygon mirror to refract in a predetermined direction; and a light-scattering section which causes the infrared laser beam that has been refracted by the optical system to scatter in a direction perpendicular to a scan direction of the infrared laser beam and outputs a line-shaped scan beam.

With this position detection system, the scan beam illumination section may include:

a first scan beam illumination section which shines a first line-shaped scan beam onto the surface to be detected; and a second scan beam illumination section which shines a second line-shaped scan beam onto the surface to be detected after the first scan beam illumination section has shone the first line-shaped scan beam onto the surface to be detected, the first scan beam illumination section may include:

a first infrared laser beam generation section which generates a first infrared laser beam;

a first section which causes the first infrared laser beam to be reflected in a first rotating polygon mirror to change a direction of the first infrared laser beam continuously;

a first optical system which causes the first infrared laser beam reflected in the first polygon mirror to refract in a predetermined direction; and a first light-scattering section which causes the first infrared laser beam that has been refracted by the first optical system to scatter in a direction perpendicular to a scan direction of the first infrared laser beam and outputs a first-direction line-shaped scan beam, and the second scan beam illumination section may include:

a second infrared laser beam generation section which generates a second infrared laser beam;

a second section which causes the second infrared laser beam to be reflected in a second rotating polygon mirror to change a direction of the second infrared laser beam continuously;

a second optical system which causes the second infrared laser beam reflected in the second polygon mirror to refract in a predetermined direction; and a second light-scattering section which causes the second infrared laser beam that has been refracted by the second optical system to scatter in a direction perpendicular to a scan direction of the second infrared laser beam and outputs a second-direction line-shaped scan beam.

With this position detection system, the scan beam illumination section may include:

a first infrared laser beam generation section which generates a first infrared laser beam;

a second infrared laser beam generation section which generates a second infrared laser beam;

a section which causes the first infrared laser beam and the second infrared laser beam to be reflected in different reflective surfaces of a rotating polygon mirror to change directions of the first infrared laser beam and the second infrared laser beam continuously;

a first optical system which causes the first infrared laser beam reflected in the first polygon mirror to refract in a predetermined direction;

a second optical system which causes the second infrared laser beam reflected in the second polygon mirror to refract in a predetermined direction;

a first light-scattering section which causes the first infrared laser beam that has been refracted by the first optical system to scatter in a direction perpendicular to a scan direction of the first infrared laser beam and outputs a first-direction line-shaped scan beam; and a second light-scattering section which causes the second infrared laser beam that has been refracted by the second optical system to scatter in a direction perpendicular to a scan direction of the second infrared laser beam and outputs a second-direction line-shaped scan beam.

With this position detection system, the polygon mirror may be configured so as not to reflect the first infrared laser beam and the second infrared laser beam simultaneously.

Another embodiment of the invention provides a game system comprising:

the above position detection system;

a game processing section which performs processing based on a pointing position on the surface to be detected that has been calculated by the position detection system; and an image generation system which generates an image to be displayed on the surface to be detected, based on processing results of the game processing section, wherein the pointing device is configured as a shooting device which resembles a gun, and wherein the game processing section performs a shooting calculation or a hit-check calculation based on the pointing position on the surface to be detected that has been detected by the position detection system.

A further embodiment of the invention provides a control method for a position detection system which detects a pointing position of a pointing device on a surface to be detected; the control method comprising:

shining a line-shaped scan beam onto the surface to be detected, and scanning the line-shaped scan beam at a predetermined speed in two different directions on the surface to be detected;

detecting the line-shaped scan beam reflected from the surface to be detected; and calculating the pointing position on the surface to be detected, based on a time from start of scanning of the line-shaped scan beam that scans in a first direction of the surface to be detected until the light-receiving section detects the line-shaped scan beam, and a time from start of scanning of the line-shaped scan beam that scans in a second direction of the surface to be detected until the light-receiving section detects the line-shaped scan beam.

Note that the embodiments described hereunder do not in any way limit the scope of the invention defined by the claims laid out herein. Note also that not all of the elements of these embodiments should be taken as essential requirements to the means of the present invention.

Figure 1:
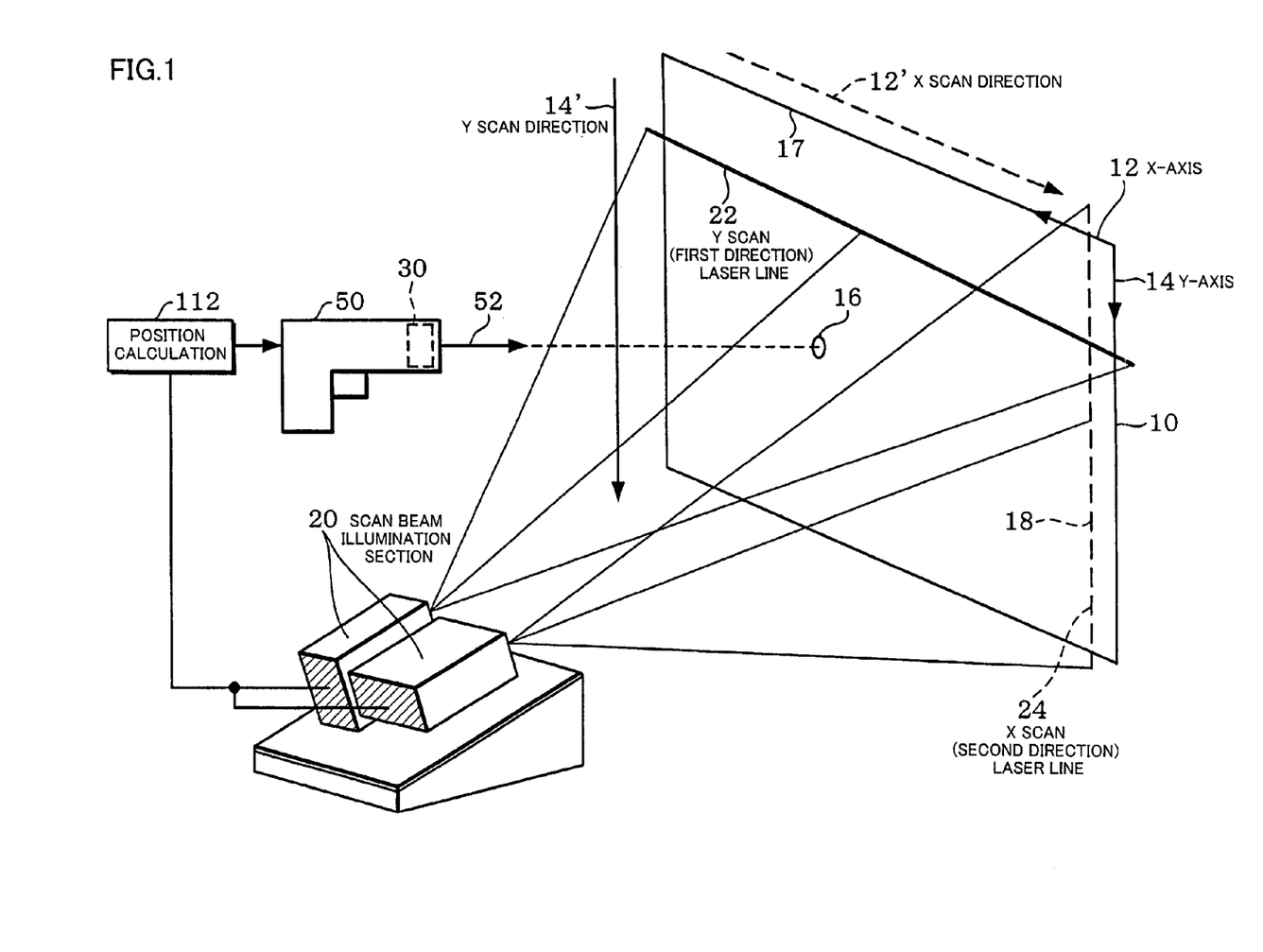
FIG. 1 is a block diagram illustrating an example of the position detection system of an embodiment of the present invention.

A block diagram that is illustrative of an example of the position detection system of this embodiment is shown in FIG. 1.

Reference number 10 denotes a surface on which an image is displayed (such as a two-dimensional plane, a CRT, a display, a liquid-crystal screen, or other screen) on which are displayed games images (background images and targets) for a shooting game. This is a two-dimensional plane (screen) on which a position can be specified in terms of an X-axis 12 and a Y-axis 14.

Reference number 50 denotes a pointing device 50 for indicating a position on the screen 10 (or a target within the screen), and it could be a gun-shaped controller or the like.

The position detection system of this embodiment includes a scan beam illumination section 20. The scan beam illumination section 20 shines a line-shaped scan beam (Y scan laser line) 22 in a first direction that is parallel to the X-axis 12 on the screen 10, to cause a scan of that line-shaped scan beam (Y scan laser line) 22 at a predetermined scanning speed in the Y-axis 14 direction (a Y scan direction 14'), then shines a line-shaped scan beam (X scan laser line) 24 in a second direction parallel to the Y-axis 14, to cause a scan of that line-shaped scan beam (X scan laser line) 24 at a predetermined scanning speed in the X-axis 12 direction (a X scan direction 12').

The line-shaped scan beams 22 and 24 preferably use light of a predetermined wavelength that is outside the visible range, such as infrared.

The scan beam illumination section 20 can be configured to scan the line-shaped scan beam 22 in the first direction and the line-shaped scan beam 24 in the second direction at a predetermined speed of approximately 1/60 seconds, for example, vertically from the upper edge of the screen to the lower edge thereof (or in the opposite direction thereto), then in the lateral direction from the left edge to the right edge (or in the opposite direction thereto). Note that the scanning speeds of the first-direction line-shaped scan beam 22 and the second-direction line-shaped scan beam 24 need not necessarily be the same, provided those speeds are sufficient for the system to detect the beams and also detect the position.

The two beams need not be perpendicular either, provided the scan of the screen is done in two intersecting directions.

The position detection system of this embodiment includes a light-receiving section 30. The light-receiving section 30 receives light from a point direction 52 of the pointing device 50 and detects the passage of the line-shaped scan beans in the first and second positions at a pointing position 16 on the screen.

The light-receiving section 30 is configured of a light-receiving element (light-receiving sensor) that is capable of detecting light of the wavelength of the line-shaped scan beams. The line-shaped scan beams 22 and 24 scan the screen for the incidence of the light from the point direction 52 of the light-receiving section 30, to detect the timing at which the line-shaped scan beams 22 and 24 pass through the pointing position 16 on the screen.

The position detection system of this embodiment includes a position calculation section 112. The position calculation section 112 calculates the pointing position 16 of the pointing device on the screen, based on the time from the start of scanning of the first-direction line-shaped scan beam 22 to the detection of the passage through the pointing position 16 and the time from the start of scanning of the second-direction line-shaped scan beam 24 to the detection of the passage through the pointing position 16.

Since the first-direction line-shaped scan beam 22 scans the screen 10 at a predetermined speed in the Y-axis direction 14, the pointing position of the first-direction line-shaped scan beam 22 with respect to the Y scan direction 14' (the coordinate thereof in the Y-axis direction) can be obtained if a scan start position 17 and the timing of the first-direction line-shaped scan beam 22 and the timing of the passage thereof through the pointing position 16 are known. Similarly, since the second-direction line-shaped scan beam 24 scans the screen 10 at a predetermined speed in the X-axis direction 12', the second-direction line-shaped scan beam 24 with respect to the X-axis 12 (the coordinate thereof in the X-axis direction) can be obtained if a scan start position 18 and the timing of the linear scan beam 24 and the timing of the passage thereof through the pointing position 16 are known.

The position calculation section 112 could calculate the pointing position of the pointing device, based on the time from the start of scanning in the X-axis direction to the detection of the passage of the first-direction line-shaped scan beam through the pointing position and the time from the start of scanning in the Y-axis direction (at the edge of the target area or screen) to the detection of the passage of the second-direction line-shaped scan beam through the pointing position, by acquiring the timing of the start of scanning in the X-axis direction, from scan control information or the like from the scan beam illumination section, and the timing of the detection of the line-shaped scan beam through the pointing position, from detection information from the light-receiving section.

The principle of the pointing position detection of this embodiment will now be described with reference to FIGS. 2A and 2B.

Figure 2A:
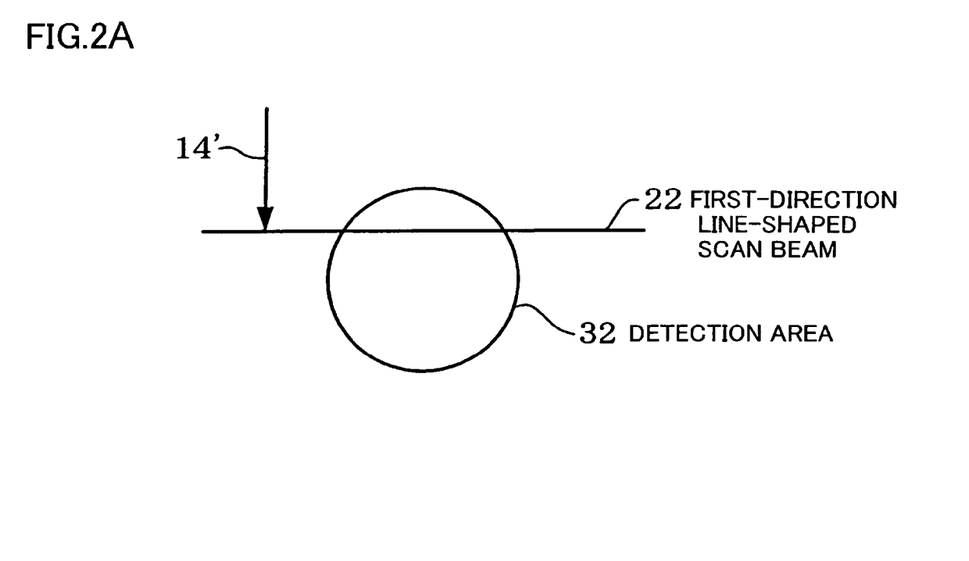
FIGS. 2A and 2B are illustrative of the principle of the pointing position detection of this embodiment.
Figure 2B:
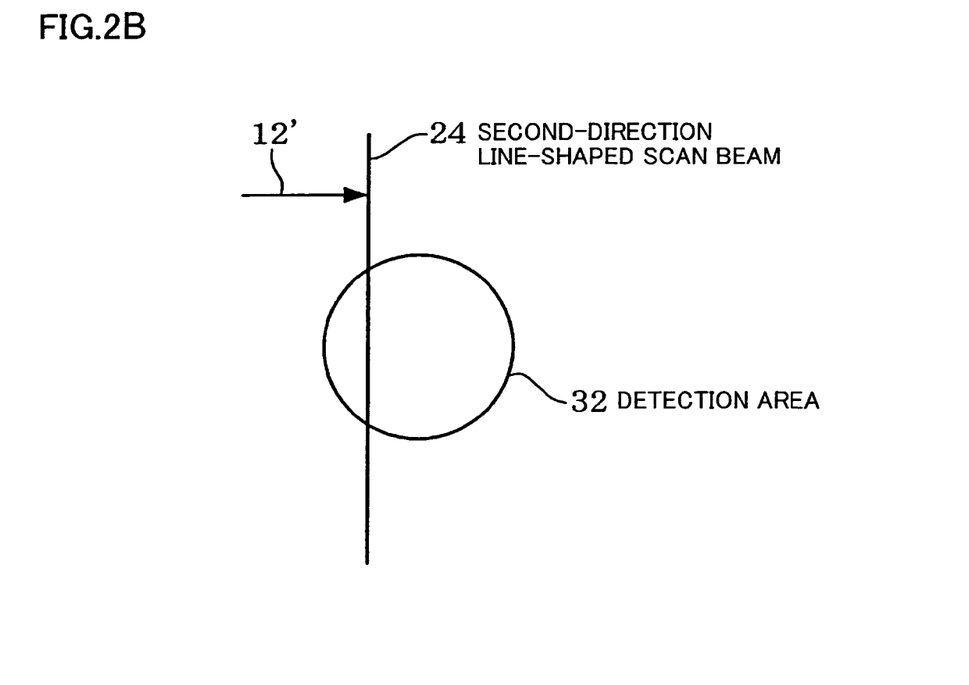

The light-receiving section 30 shown in FIGS. 2A and 2B has a circular detection area 32. Thus, when the pointing device 50 is pointed towards the screen, the detection area 32 for the light-receiving sensor of the light-receiving section is set at the pointing position on the screen (16 in FIG. 1).

When the first-direction line-shaped scan beam 22 passes through the detection area 32, as shown in FIG. 2A, the light-receiving sensor detects that light and outputs a detection pulse.

Similarly, when the second-direction line-shaped scan beam 24 passes through the detection area 32, as shown in FIG. 2B, the light-receiving sensor detects that light and outputs a detection pulse.

Figure 3:
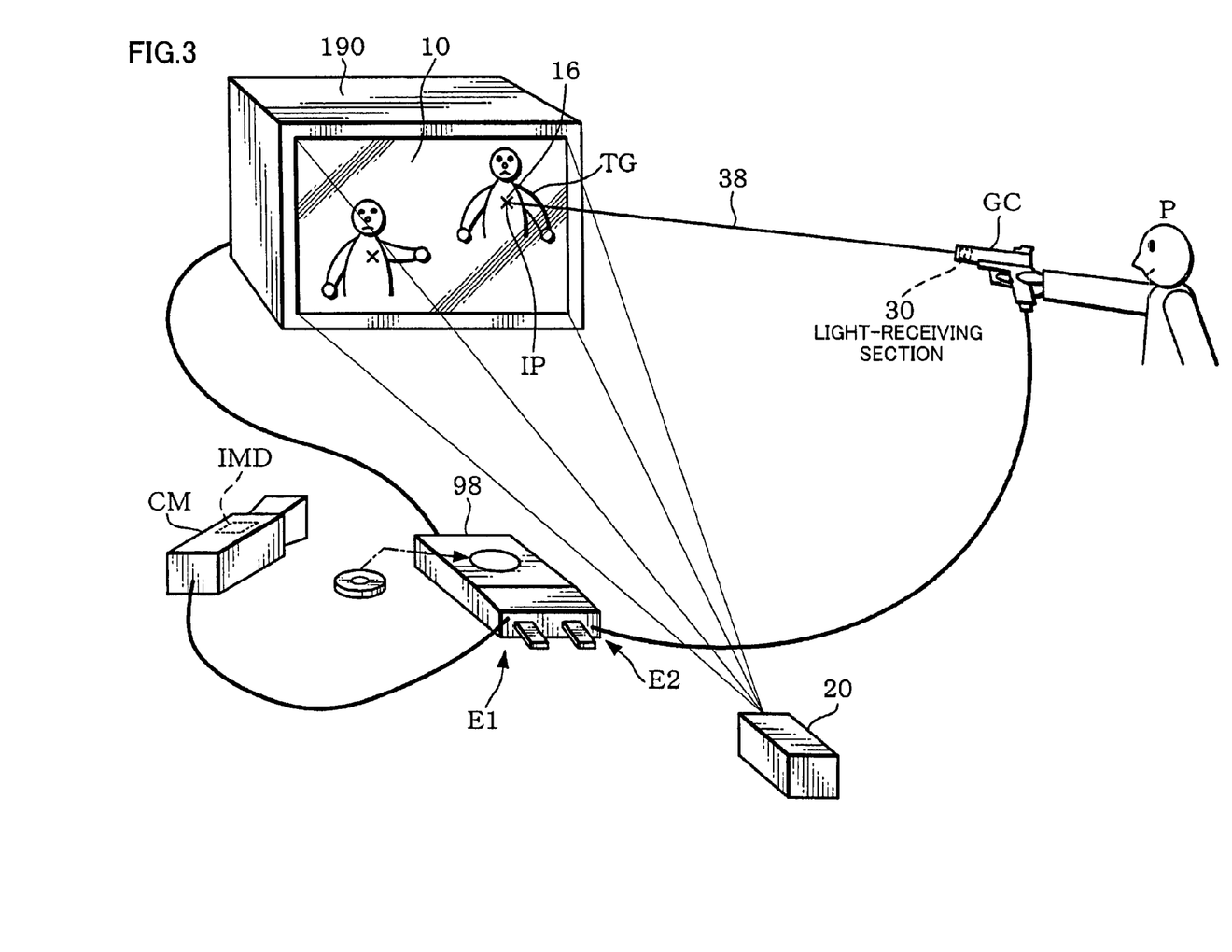
FIG. 3 shows an example of a game device (image generation device) which includes the position detection system of this embodiment.

An example of a game device (image generation device) including the position detection system of this embodiment is shown in FIG. 3.

The scan beam illumination section 20 is disposed with respect to the screen 10 at a position at which the first-direction line-shaped scan beam 22 can illuminate the screen in such a manner that the position illuminated on the screen by the line-shaped scan beam (Y scan laser line) 22 that is parallel to the X-axis 12 moves in the Y-axis direction 14, then the linear scan beam 24 can illuminate the screen in such a manner that the position illuminated on the screen by the line-shaped scan beam (X scan laser line) 24 that is parallel to the Y-axis 14 moves in the X-axis direction 12. The first-direction line-shaped scan beam 22 and the second-direction line-shaped scan beam 24 could be configured to emit light and scan throughout the game, or they could be configured to emit light and scan when the player has pulled the trigger of a gun-shaped controller GC (generally speaking: a pointing device, shooting device, hereinafter the same).

The light-receiving section 30 is provided in the gun nozzle of the gun-shaped controller GC to receive light from the direction in which the gun-shaped controller GC is pointing and detect the timing at which the first and second-direction line-shaped scan beams pass through the pointing position on the screen.

When a player P directs the gun-shaped controller GC towards the screen 10, aims at a target TG, and pulls the trigger, the light-receiving section 30 detects the first-direction line-shaped scan beam 22 and the second-direction line-shaped scan beam 24 at the pointing position 16 on the screen 10. The system performs processing to detect the pointing position of the gun-shaped controller (the pointing position on the screen), based on the time from the start of scanning in the X-axis 12 direction (at the edge of the target area or screen 10) until the first-direction line-shaped scan beam is detected and the time from the start of scanning in the Y-axis 14 direction (at the edge of the target area or screen) until the first infrared scan beam is received. It then checks whether or not the target TG has been hit and, if the target has been hit, it adds points to that player's game score and reproduce the motions of the target that has been hit. Game images corresponding to this game processing are displayed on the screen 10.

Figure 4:
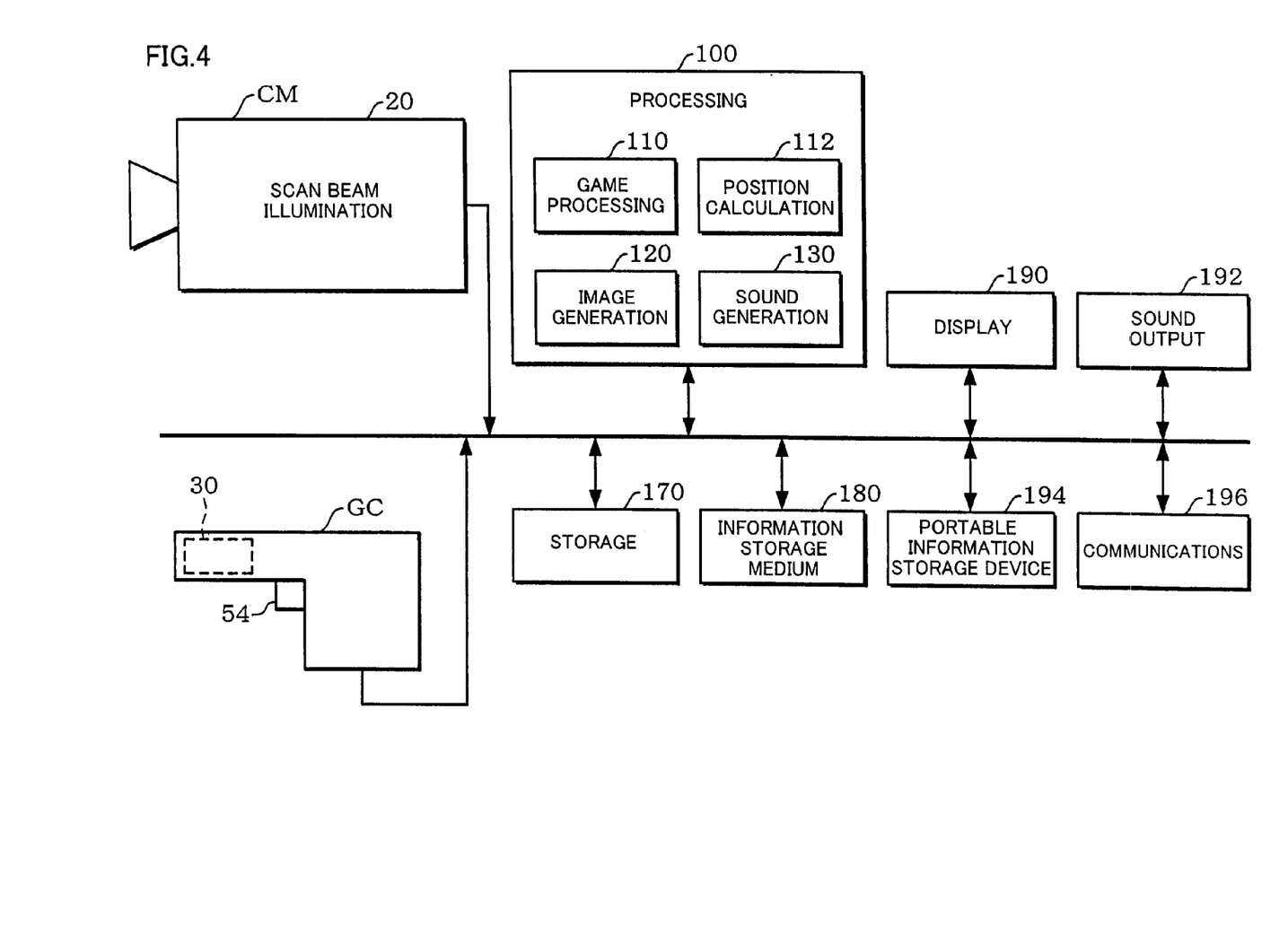
FIG. 4 shows an example of the functional block diagram of the game device and position detection system of the embodiments of the invention.

A functional block diagram of a game device and position detection system in accordance with this embodiment is shown in FIG. 4. Note that the configuration could be such that some of the components of FIG. 4 are omitted The gun-shaped controller GC includes the light-receiving section 30, which detects the light-reception timing of the line-shaped scan in the first direction and the line-shaped scan in the second direction, and a trigger 54, which indicates the firing timing (pointing timing, shooting timing) that is a pointing event performed by the player.

The scan beam illumination section 20 performs processing to shine the line-shaped scan beam onto the screen in the first direction that is parallel to the X-axis, to scan that line-shaped scan beam at a predetermined scanning speed in the Y-axis direction, then shine the line-shaped scan beam parallel to the Y-axis, to scan that line-shaped scan beam at a predetermined scanning speed in the X-axis direction.

A storage section 170 forms a work area for components such as a processing section 100 and a communications section 196, and the functions thereof can be implemented by hardware such as RAM.

The storage section 170 could include a reference value information storage section 172 that stores a reference value corresponding to a detection value obtained by a two-dimensional position detection section when the pointing device is in a predetermined disposition.

Note that the reference value could be set on the basis of a value detected by a two-dimensional optical position detection sensor.

An information storage medium 180 (a medium that can be read by a computer) holds information such as a program and data, and the functions thereof can be implemented by an optical disk (CD or DVD), a hard disk, or memory (ROM). The processing section 100 bases the execution of the various different processes of this embodying example on the program (data) stored in this information storage medium 180. In other words, a program that causes a computer to function as the various components of this embodying example (a program for executing various processing in a computer) is stored in the information storage medium 180.

A screen 190 is designed to output the images generated by this embodiment, and the functions thereof can be implemented by a CRT, a projection type of display, or an LCD. A sound output section 192 designed to output the sounds generated by this embodiment, and the functions thereof can be implemented by hardware such as a speaker or headphones.

A portable information storage device 194 (such as a memory card or portable game device) stores data such as a player's personal data and saved game data. The communications section 196 provides various types of control for communicating with an external device (such as a host device or another game system), and the functions thereof can be implemented by hardware such as various types of processor or a communications ASIC, or by a program.

Note that a program (data) for causing a computer to function as the various components of this embodiment could be distributed to the information storage medium 180 (the storage section 170) from an information storage medium possessed by a host device (server), through a network and the communications section 196. Such use of an information storage medium on the host device (server) is also included within the scope of the invention The processing section 100 (processor) executes various types of processing, such as game processing, image generation processing, or sound generation processing, based on the detection value from the light-receiving section 30, scan start timing information from the scan beam illumination section 20, or a program.

The processing section 100 includes a game processing section 110, the position calculation section 112, an image generation section 120, and a sound generation section 130. Note that some of these components could be omitted. The functions of the processing section 100 can be implemented by hardware such as various types of processor or a communications ASIC, or by a program. The detection processing and determination processing of the illumination position could be done by the processing section 100. In such a case, the processing section 100 is provided with a position detection section and a determination section.

The game processing section 110 performs processing such as that for starting the game if certain game start conditions have been satisfied, processing for moving the game forward, processing for disposing objects such as characters and maps, processing for displaying the objects, processing for calculating game results, or processing for ending the game if certain game end conditions have been satisfied.

More specifically, the game processing section 110 calculates the path of each shot and performs a hit-check against targets, based on disposition information for the shooting device (such as position, angle, and rotation of the shooting device) that has been calculated by the position calculation section 112. If the system determines that the bullet has hit a target, points are added to the game score of that player. It then performs processing such as that to reproduce the motion of the target that has been hit by the bullet.

The position calculation section 112 performs processing to calculate the pointing position of the pointing device on the screen, based on the time from the start of scanning of the first-direction line-shaped scan beam to the detection of the pointing position passage and the time from the start of scanning of the second-direction line-shaped scan beam to the detection of the pointing position passage.

The image generation section 120 performs drawing processing based on the results of various different processes (game processing) executed by the processing section 100, to generate images for output to the display section 190. For example, to generate a three-dimensional image, geometry processing such as coordinate conversion, clipping processing, and transparency conversion is first performed, then primitive surface data is created, based on the results of that processing. An image of an object (formed of one or more primitive surfaces) after the geometrical processing is then drawn into a drawing buffer (frame buffer), based on this primitive surface data (drawing data). This ensures the creation of an image as seen by a virtual camera (given viewpoint) within an object space.

The sound generation section 130 executes sound processing based on the results of various different processes executed by the processing section 100, to generate game sounds such as background music, sound effects, and voices for output to the sound output section 192.

Note that the processing of the processing section 100 of FIG. 4 could be distributed between a plurality of CPUs (such as a CPU having a main PCB and a sub PCB). For example, a sub PCB could be installed in the GC and that sub PCB could be given the function of the position detection section.

Note that FIGS. 3 and 4 illustrate an example in which one player is playing the game, but the invention can of course be applied to games involving two or more players.

Similarly, FIGS. 3 and 4 illustrate an example in which the pointing device is a gun-shaped controller, but the invention can also be applied to controllers of various different shapes and forms, such as rifle-shaped or sword-shaped controllers.

Figure 5:
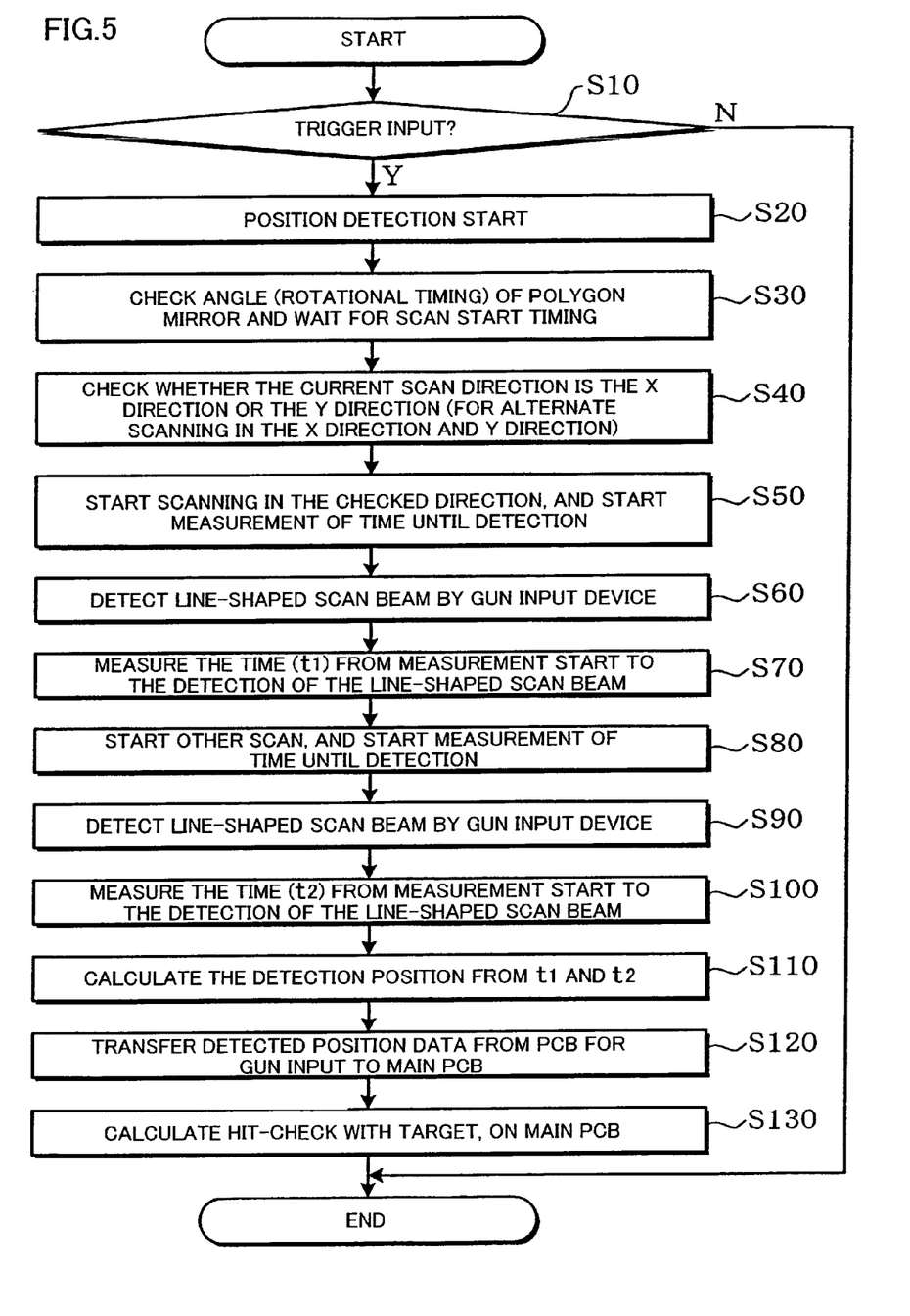
FIG. 5 is a flowchart illustrating the flow of position detection processing of this embodiment.

A flowchart illustrating the flow of position detection processing in accordance with this embodiment is shown in FIG. 5.

The following processing for detecting the player's trigger output is performed (step S10).

When trigger input information is received, the light-receiving section of the gun-shaped controller starts the position detection of the line-shaped scan beam (step S20).

The system then checks the angle (rotational timing) of the polygon mirror and waits for the scan start timing (step S30).

Since the line-shaped scan beams of the scan beam illumination section scan alternately in the X and Y directions, the system checks whether the current scan direction is the X direction or the Y direction (step S40).

The system starts the scan in the checked direction, and starts measuring the time until detection (step S50).

The line-shaped scan beam is detected by the light-receiving section of the gun-shaped controller (step S60).

The system measures the time (t1) from measurement start to the detection of the line-shaped scan beam (step S70).

The other scan starts, and the measurement of time until detection also starts (step S80).

The line-shaped scan beam is detected by the light-receiving section of the gun-shaped controller (step S90)

The system measures the time (t2) from measurement start to the detection of the other line-shaped scan beam (step S100).

The system calculates the detection position from t1 and t2 (step S110).

The detection position data is transferred to the main PCB by the PCB for gun input (step S120).

The system performs calculations such as a hit-check with a target in the game space on the main PCB (step S130).

Figure 6:
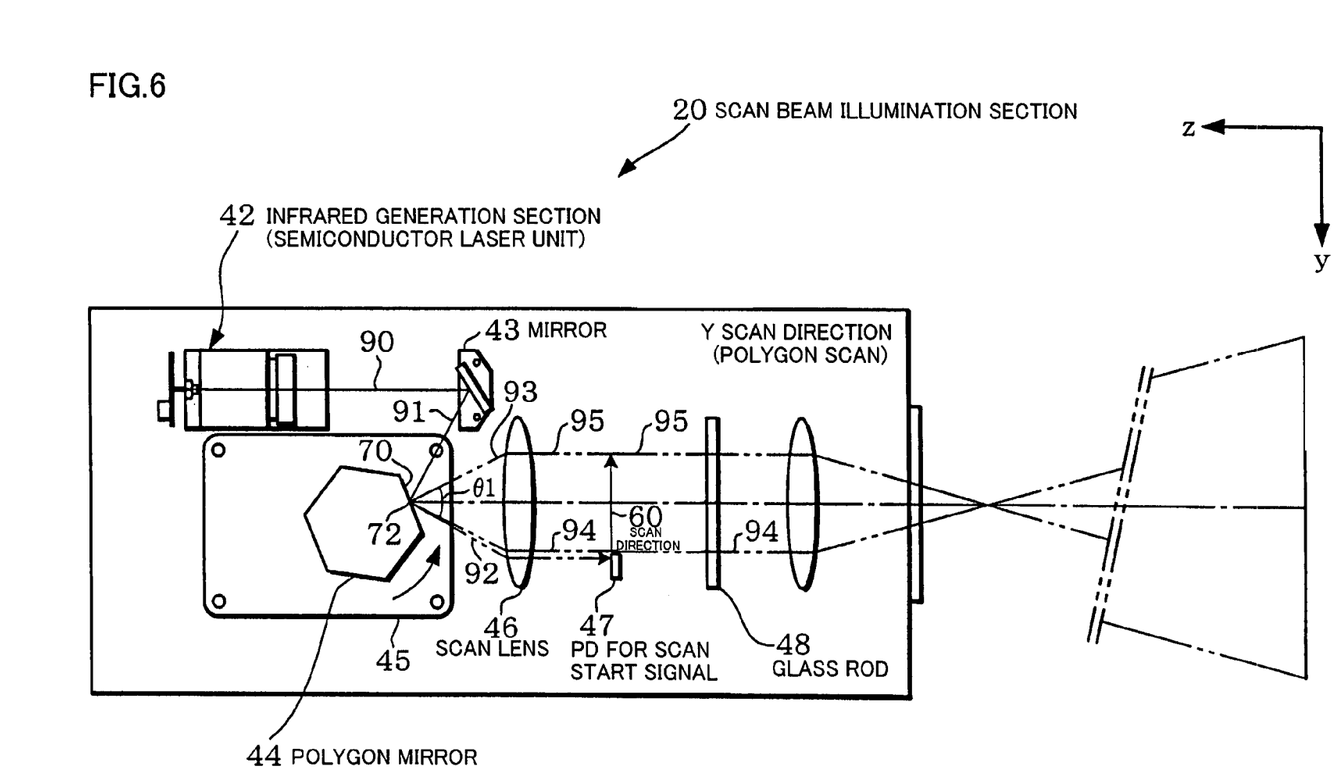
FIG. 6 is illustrative of the configuration of the scan beam illumination section of this embodiment.
Figure 7:
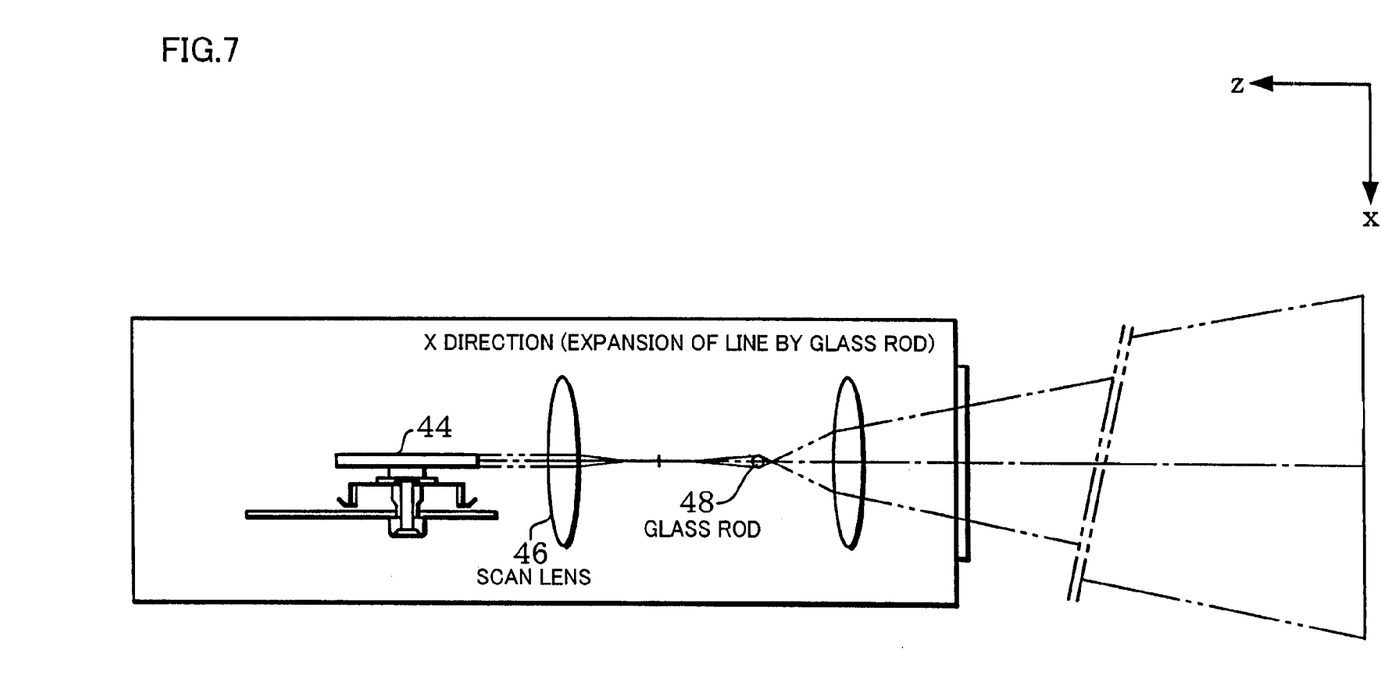
FIG. 7 is further illustrative of the configuration of the scan beam illumination section of this embodiment.

The configuration of the scan beam illumination section of this embodiment is shown in FIGS. 6 and 7. FIG. 6 is a side view of the scan beam illumination device that configures the scan beam illumination section (as seen from the X-axis direction) and FIG. 7 is a plan view of the scan beam illumination device (as seen from the Y-axis direction).

The scan beam illumination section 20 is provided with an infrared generation section 42 that generates an infrared laser beam 90; a polygon mirror 44 that causes continuous changes in the orientation of the infrared laser beam; an optical system (lens) 46 that causes infrared laser beams 92 to 93 of a continuously changing orientation to refract and become parallel infrared laser beams 94 to 95 in a scan direction 60; and a light-scattering section (glass rod) 48 that causes scattering of the parallel infrared laser beams 94 to 95, which are moving parallel to the predetermined scan direction 60, in the directions perpendicular to the scan direction 60 to form a line-shaped scan beam.

The infrared generation section 42 is configured of a semiconductor laser unit that emits an infrared laser beam of a predetermined wavelength, by way of example.

The polygon mirror 44 is a rotation member having a series of flat reflective surfaces around the periphery thereof, which is used for reflecting light from the light source onto the object (screen) being scanned. In this case, it is a hexagonal polygon mirror which has six flat reflective surfaces and which rotates once per 1/120 seconds.

The optical system can be configured of lenses and the light-scattering section 48 can be configured of a glass rod, by way of example.

The infrared laser beam 90 generated by the infrared generation section 42 is reflected by a mirror 43, and an infrared laser beam 91 reflected therefrom is incident on the flat reflective surfaces of the polygon mirror 44 that is rotating at high speed. Since the polygon mirror 44 is rotating in this case, the angle of incidence of the infrared laser beam 91 with respect to each flat reflective surface 70 thereof changes with time, so that the orientation of the infrared laser beam 92 reflected from the flat reflective surface 70 changes within a predetermined range θ1. In other words, the orientation of the light beam that strikes one flat reflective surface and is reflected thereby varies from 92 to 93, and the orientation of the light beam that strikes the next flat reflective surface and is reflected thereby varies from 92 to 93. The orientation of the light beam reflected from each flat reflective surface 70 of the polygon mirror 44 is changed by the scan lens 46 to be in the Z-axis direction, so that light beams 92 to 93 reflected by the polygon mirror and incident on the scan lens 46 become light beams 94 to 95 that are parallel to the scan direction 60.

The configuration could be such that a PD 47 for a scan start signal is provided in a portion at which the infrared laser beam 94 hits the scan start point, to detect the scan start in that direction.

The infrared laser beams 94 to 95 that each form a spot of projected light at that point are scattered in the X-axis direction as they pass through the glass rod, as shown in FIG. 7, so that the projected light forms a line-shaped Y scan laser line as shown in FIG. 1.

The Y scan laser line 22 then performs a transitional scan in the Y scan direction 14' shown in FIG. 1, by the infrared laser beam performing a transitional scan in the scan direction 60 as shown in FIG. 6.

Note that the description relating to FIGS. 6 and 7 relates to the configuration of a device (first scan beam illumination section and Y scan laser line illumination device) that generates a Y scan laser line (first-direction line-shaped scan beam) that performs a transitional scan in the Y scan direction of the scan beam illumination section, but the description could also correspond to a configuration of a device (second scan beam illumination section and X scan laser line illumination device) that generates an X scan laser line (second-direction line-shaped scan beam) that performs a transitional scan in the X scan direction of the scan beam illumination section, by rotating the disposition with respect to the screen through 90 degrees.

After the first scan beam illumination section has shone the first-direction line-shaped scan beam onto the screen, the second scan beam illumination section shines the second-direction line-shaped scan beam onto the screen.

Figure 8:
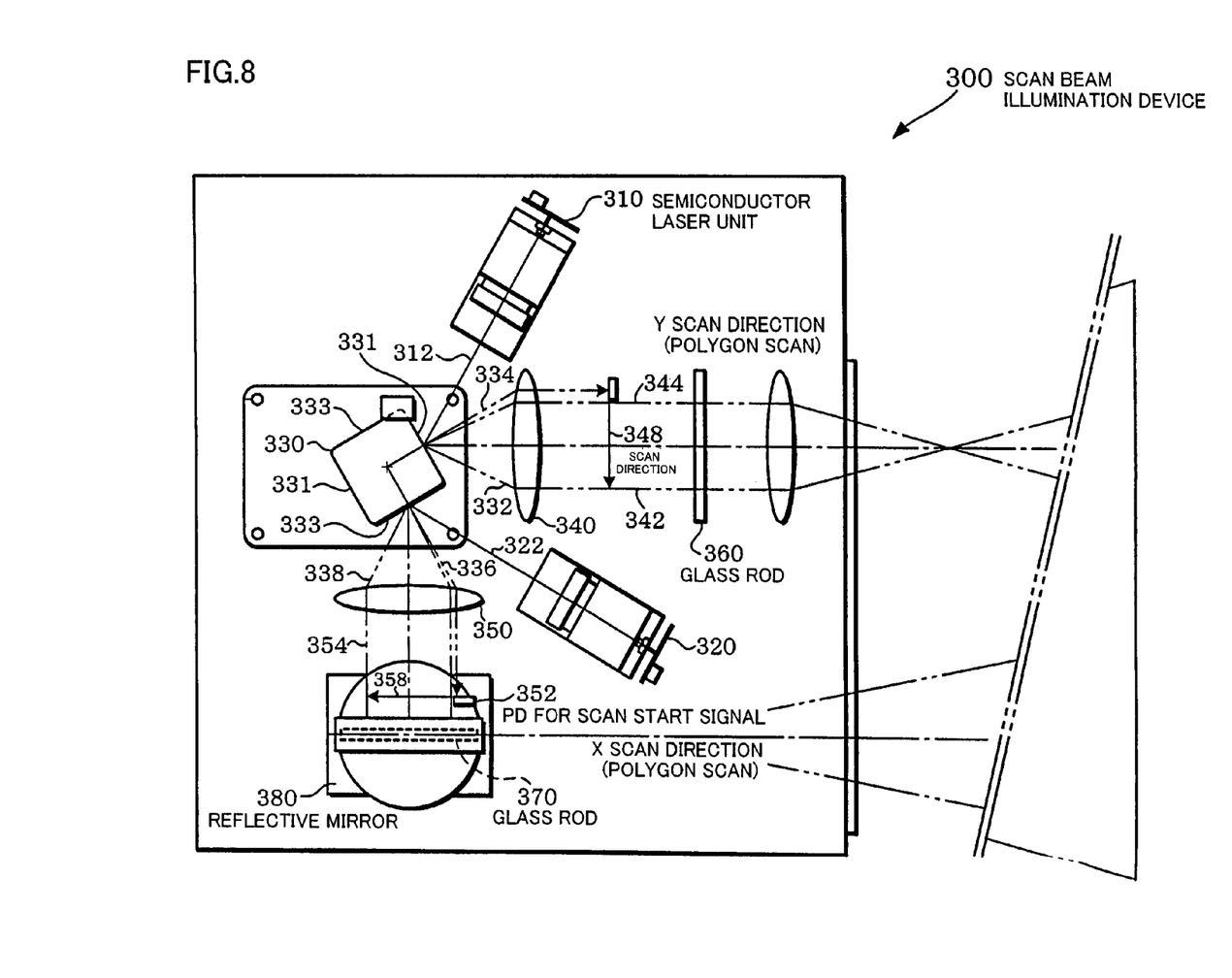
FIG. 8 is illustrative of the configuration of a scan beam illumination device in which the Y scan laser line illumination section and the X scan laser line illumination section use a polygon mirror in common.

An illustrative view of the configuration of a scan beam illumination device in which the Y scan laser line illumination section and the X scan laser line illumination section use the polygon mirror in common is shown in FIG. 8.

A scan beam illumination device 410 including a first infrared laser beam generation section 310 that generates a first infrared laser beam 312; a second infrared laser beam generation section 320 that generates a second infrared laser beam 322; a polygon mirror 330 that causes continuous changes in the orientations of the first infrared laser beam 312 and the second infrared laser beam 322; a first optical system (scan lens) 340 that causes reflected light beams 332 to 334 from the first infrared laser beam 312 to change into parallel light beams 342 to 344 in a scan direction 348; a second optical system (scan lens) 350 that causes reflected light beams 336 to 338 from the second infrared laser beam 322 to change into parallel light beams 352 to 354 in a scan direction 358; a light-scattering section (glass rod) 360 that scatters the parallel light beams 342 to 344 of the first infrared laser beam 312 in the direction perpendicular to the scan direction 348, to output a first-direction line-shaped scan beam; and a light-scattering section (glass rod) 370 that scatters the parallel light beams 336 to 338 of the second infrared laser beam 322 in the direction perpendicular to the scan direction 358, to output a second-direction line-shaped scan beam.

The light that has been scattered by the light-scattering section (glass rod) 370 is reflected in the direction of the screen by a reflective mirror 380, to shine onto the screen.

In this case, the four-sided polygon mirror 330 is a two-sided polygon mirror having a reflective surface 331 on each or two opposite surfaces. During the period in which the first infrared laser beam 312 is reflected by each reflective surface 331, the second infrared laser beam 322 strikes a non-reflecting surface 333 thereof, and during the period in which the second infrared laser beam 322 is reflected by each reflective surface 331, the first infrared laser beam 312 strikes the corresponding non-reflecting surface 333. Thus the polygon mirror 330 is configured to ensure that it does not reflect the first infrared laser beam 312 and the second infrared laser beam 322 simultaneously, so that the first-direction line-shaped scan beam and the second-direction line-shaped scan beam can illuminated the screen alternately.

The above embodiment was described as relating to an example in which the first direction line-shaped scan beam and the second direction line-shaped scan beam shine alternately, but the invention is not limited thereto. For example, the configuration could be such that the beams shine simultaneously.

In the position detection system of the above-described embodiment, the configuration could be such that the characteristics (such as frequency (wavelength)) of the infrared laser beams emitted by the first infrared laser beam generation section and the second infrared laser beam generation section are made to be different, a filter that passes the laser beam generated by the first infrared laser beam generation section and a filter that passes the laser beam generated by the second infrared laser beam generation section are provided in the light-receiving section, and light-receiving sensors that can detect the light passing through each filter are provided.

The position detection system of the above-described embodiment could also be provided with a light-receiving section that is configured of a light-receiving element that can detect the frequency (wavelength) of the light that is received, and a scan direction recognition section that recognizes the scan direction of the line-shaped scan beam that is received from the frequency that the light-receiving element has detected. The scan direction recognition section in this case could be implemented by hardware (such as circuitry) or it could be implemented by software Note that the invention is not limited to this embodiment and thus various modifications thereto are possible within the scope of the invention laid out herein.

For example, terminology that is derived from generic terminology defined within this document and figures could be replaced by other terminology used within this document and figures, in either a broad sense or specifically.

It is also possible for an aspect of the invention that is defined by a dependent claim to omit some of the configurational requirements of the corresponding antecedent claim. Similarly, the components of the invention defined by an independent claim can also be allocated to other independent claims.

The invention can be applied to various games (such as shooting games, robot-battling games, sports games, and role-playing games).

The invention can be applied to various image generation systems (game systems) such as arcade game systems, domestic game systems, large-scale attractions in which many players can participate, simulators, and personal computers.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A position detection system which detects a pointing position of a pointing device on a surface to be detected; the position detection system comprising:
   a scan beam illumination section which shines a line-shaped scan beam onto the surface to be detected, and scans the line-shaped scan beam at a predetermined speed in two different directions on the surface to be detected;
   a light-receiving section which detects the line-shaped scan beam reflected from the surface to be detected; and
   a position calculation section which calculates the pointing position on the surface to be detected, based on a time from start of scanning of the line-shaped scan beam that scans in a first direction of the surface to be detected until the light-receiving section detects the line-shaped scan beam, and a time from start of scanning of the line-shaped scan beam that scans in a second direction of the surface to be detected until the light-receiving section detects the line-shaped scan beam.

2. The position detection system as defined by claim 1, wherein the scan beam illumination section has a light generation section which generates light of different frequencies as the line-shaped scan beam in the first direction and the line-shaped scan beam in the second direction, and
   wherein the light-receiving section has a filter which passes the line-shaped scan beam in the first direction, another filter which passes the line-shaped scan beam in the second direction, and a sensor which receives light that has passed through each of the filters.

3. The position detection system as defined by claim 2, wherein when a predetermined pointing event has occurred, the position calculation section calculates the pointing position of the pointing device on the surface to be detected, based on a time from start of scanning of the first-direction line-shaped scan beam until passage of scanning through the pointing position is detected and a time from start of scanning of the second-direction line-shaped scan beam until passage of scanning through the pointing position is detected.

4. The position detection system as defined by claim 2, wherein the scan beam illumination section starts illumination of the line-shaped scan beam at a timing at which a predetermined pointing event occurs.

5. The position detection system as defined by claim 2, wherein the scan beam illumination section includes:
   an infrared laser beam generation section which generates an infrared laser beam;
   a section which causes the infrared laser beam to be reflected in a rotating polygon mirror to change a direction of the infrared laser beam continuously;
   an optical system which causes the infrared laser beam reflected in the polygon mirror to refract in a predetermined direction; and
   a light-scattering section which causes the infrared laser beam that has been refracted by the optical system to scatter in a direction perpendicular to a scan direction of the infrared laser beam and outputs a line-shaped scan beam.

6. The position detection system as defined by claim 2, wherein the scan beam illumination section includes:
   a first scan beam illumination section which shines a first line-shaped scan beam onto the surface to be detected; and
   a second scan beam illumination section which shines a second line-shaped scan beam onto the surface to be detected after the first scan beam illumination section has shone the first line-shaped scan beam onto the surface to be detected,
   wherein the first scan beam illumination section includes:
   a first infrared laser beam generation section which generates a first infrared laser beam;
   a first section which causes the first infrared laser beam to be reflected in a first rotating polygon mirror to change a direction of the first infrared laser beam continuously;
   a first optical system which causes the first infrared laser beam reflected in the first polygon mirror to refract in a predetermined direction; and
   a first light-scattering section which causes the first infrared laser beam that has been refracted by the first optical system to scatter in a direction perpendicular to a scan direction of the first infrared laser beam and outputs a first-direction line-shaped scan beam, and
   wherein the second scan beam illumination section includes:
   a second infrared laser beam generation section which generates a second infrared laser beam;
   a second section which causes the second infrared laser beam to be reflected in a second rotating polygon mirror to change a direction of the second infrared laser beam continuously;
   a second optical system which causes the second infrared laser beam reflected in the second polygon mirror to refract in a predetermined direction; and
   a second light-scattering section which causes the second infrared laser beam that has been refracted by the second optical system to scatter in a direction perpendicular to a scan direction of the second infrared laser beam and outputs a second-direction line-shaped scan beam.

7. The position detection system as defined by claim 2, wherein the scan beam illumination section includes:
   a first infrared laser beam generation section which generates a first infrared laser beam;
   a second infrared laser beam generation section which generates a second infrared laser beam;
   a section which causes the first infrared laser beam and the second infrared laser beam to be reflected in different reflective surfaces of a rotating polygon mirror to change directions of the first infrared laser beam and the second infrared laser beam continuously;
   a first optical system which causes the first infrared laser beam reflected in the first polygon mirror to refract in a predetermined direction;
   a second optical system which causes the second infrared laser beam reflected in the second polygon mirror to refract in a predetermined direction;
   a first light-scattering section which causes the first infrared laser beam that has been refracted by the first optical system to scatter in a direction perpendicular to a scan direction of the first infrared laser beam and outputs a first-direction line-shaped scan beam; and
   a second light-scattering section which causes the second infrared laser beam that has been refracted by the second optical system to scatter in a direction perpendicular to a scan direction of the second infrared laser beam and outputs a second-direction line-shaped scan beam.

8. The position detection system as defined by claim 7, wherein the polygon mirror is configured so as not to reflect the first infrared laser beam and the second infrared laser beam simultaneously.

9. The position detection system as defined by claim 1, wherein the scan beam illumination section has a light generation section which generates light of different frequencies as the line-shaped scan beam in the first direction and the line-shaped scan beam in the second direction, and wherein the light-receiving section has a recognition section which recognizes a scan direction of the line-shaped scan beam that is received, based on the frequency of light that is received thereby.

10. The position detection system as defined by claim 9, wherein when a predetermined pointing event has occurred, the position calculation section calculates the pointing position of the pointing device on the surface to be detected, based on a time from start of scanning of the first-direction line-shaped scan beam until passage of scanning through the pointing position is detected and a time from start of scanning of the second-direction line-shaped scan beam until passage of scanning through the pointing position is detected.

11. The position detection system as defined by claim 9, wherein the scan beam illumination section starts illumination of the line-shaped scan beam at a timing at which a predetermined pointing event occurs.

12. The position detection system as defined by claim 9, wherein the scan beam illumination section includes:
an infrared laser beam generation section which generates an infrared laser beam;
a section which causes the infrared laser beam to be reflected in a rotating polygon mirror to change a direction of the infrared laser beam continuously;
an optical system which causes the infrared laser beam reflected in the polygon mirror to refract in a predetermined direction; and
a light-scattering section which causes the infrared laser beam that has been refracted by the optical system to scatter in a direction perpendicular to a scan direction of the infrared laser beam and outputs a line-shaped scan beam.

13. The position detection system as defined by claim 9, wherein the scan beam illumination section includes:
a first scan beam illumination section which shines a first line-shaped scan beam onto the surface to be detected; and
a second scan beam illumination section which shines a second line-shaped scan beam onto the surface to be detected after the first scan beam illumination section has shone the first line-shaped scan beam onto the surface to be detected,
wherein the first scan beam illumination section includes:
a first infrared laser beam generation section which generates a first infrared laser beam;
a first section which causes the first infrared laser beam to be reflected in a first rotating polygon mirror to change a direction of the first infrared laser beam continuously;
a first optical system which causes the first infrared laser beam reflected in the first polygon mirror to refract in a predetermined direction; and
a first light-scattering section which causes the first infrared laser beam that has been refracted by the first optical system to scatter in a direction perpendicular to a scan direction of the first infrared laser beam and outputs a first-direction line-shaped scan beam, and wherein the second scan beam illumination section includes:
a second infrared laser beam generation section which generates a second infrared laser beam;
a second section which causes the second infrared laser beam to be reflected in a second rotating polygon mirror to change a direction of the second infrared laser beam continuously;
a second optical system which causes the second infrared laser beam reflected in the second polygon mirror to refract in a predetermined direction; and
a second light-scattering section which causes the second infrared laser beam that has been refracted by the second optical system to scatter in a direction perpendicular to a scan direction of the second infrared laser beam and outputs a second-direction line-shaped scan beam.

14. The position detection system as defined by claim 9, wherein the scan beam illumination section includes:
a first infrared laser beam generation section which generates a first infrared laser beam;
a second infrared laser beam generation section which generates a second infrared laser beam;
a section which causes the first infrared laser beam and the second infrared laser beam to be reflected in different reflective surfaces of a rotating polygon mirror to change directions of the first infrared laser beam and the second infrared laser beam continuously;
a first optical system which causes the first infrared laser beam reflected in the first polygon mirror to refract in a predetermined direction;
a second optical system which causes the second infrared laser beam reflected in the second polygon mirror to refract in a predetermined direction;
a first light-scattering section which causes the first infrared laser beam that has been refracted by the first optical system to scatter in a direction perpendicular to a scan direction of the first infrared laser beam and outputs a first-direction line-shaped scan beam; and
a second light-scattering section which causes the second infrared laser beam that has been refracted by the second optical system to scatter in a direction perpendicular to a scan direction of the second infrared laser beam and outputs a second-direction line-shaped scan beam.

15. The position detection system as defined by claim 14, wherein the polygon mirror is configured so as not to reflect the first infrared laser beam and the second infrared laser beam simultaneously.

16. The position detection system as defined by claim 1, wherein when a predetermined pointing event has occurred, the position calculation section calculates the pointing position of the pointing device on the surface to be detected, based on a time from start of scanning of the first-direction line-shaped scan beam until passage of scanning through the pointing position is detected and a time from start of scanning of the second-direction line-shaped scan beam until passage of scanning through the pointing position is detected.

17. The position detection system as defined by claim 1, wherein the scan beam illumination section starts illumination of the line-shaped scan beam at a timing at which a predetermined pointing event occurs.

18. The position detection system as defined by claim 1, wherein the scan beam illumination section includes:

an infrared laser beam generation section which generates an infrared laser beam;

a section which causes the infrared laser beam to be reflected in a rotating polygon mirror to change a direction of the infrared laser beam continuously;

an optical system which causes the infrared laser beam reflected in the polygon mirror to refract in a predetermined direction; and a light-scattering section which causes the infrared laser beam that has been refracted by the optical system to scatter in a direction perpendicular to a scan direction of the infrared laser beam and outputs a line-shaped scan beam.

19. A game system comprising:

the position detection system as defined by claim 18;

a game processing section which performs processing based on a pointing position on the surface to be detected that has been calculated by the position detection system; and an image generation system which generates an image to be displayed on the surface to be detected, based on processing results of the game processing section, wherein the pointing device is configured as a shooting device which resembles a gun, and wherein the game processing section performs a shooting calculation or a hit-check calculation based on the pointing position on the surface to be detected that has been detected by the position detection system.

20. The position detection system as defined by claim 1, wherein the scan beam illumination section includes:

a first scan beam illumination section which shines a first line-shaped scan beam onto the surface to be detected; and a second scan beam illumination-section which shines a second line-shaped scan beam onto the surface to be detected after the first scan beam illumination section has shone the first line-shaped scan beam onto the surface to be detected, wherein the first scan beam illumination section includes:

a first infrared laser beam generation section which generates a first infrared laser beam;

a first section which causes the first infrared laser beam to be reflected in a first rotating polygon mirror to change a direction of the first infrared laser beam continuously;

a first optical system which causes the first infrared laser beam reflected in the first polygon mirror to refract in a predetermined direction; and a first light-scattering section which causes the first infrared laser beam that has been refracted by the first optical system to scatter in a direction perpendicular to a scan direction of the first infrared laser beam and outputs a first-direction line-shaped scan beam, and wherein the second scan beam illumination section includes:

a second infrared laser beam generation section which generates a second infrared laser beam;

a second section which causes the second infrared laser beam to be reflected in a second rotating polygon mirror to change a direction of the second infrared laser beam continuously;

a second optical system which causes the second infrared laser beam reflected in the second polygon mirror to refract in a predetermined direction; and a second light-scattering section which causes the second infrared laser beam that has been refracted by the second optical system to scatter in a direction perpendicular to a scan direction of the second infrared laser beam and outputs a second-direction line-shaped scan beam.

21. The position detection system as defined by claim 1, wherein the scan beam illumination section includes:

a first infrared laser beam generation section which generates a first infrared laser beam;

a second infrared laser beam generation section which generates a second infrared laser beam;

a section which causes the first infrared laser beam and the second infrared laser beam to be reflected in different reflective surfaces of a rotating polygon mirror to change directions of the first infrared laser beam and the second infrared laser beam continuously;

a first optical system which causes the first infrared laser beam reflected in the first polygon mirror to refract in a predetermined direction;

a second optical system which causes the second infrared laser beam reflected in the second polygon mirror to refract in a predetermined direction;

a first light-scattering section which causes the first infrared laser beam that has been refracted by the first optical system to scatter in a direction perpendicular to a scan direction of the first infrared laser beam and outputs a first-direction line-shaped scan beam; and a second light-scattering section which causes the second infrared laser beam that has been refracted by the second optical system to scatter in a direction perpendicular to a scan direction of the second infrared laser beam and outputs a second-direction line-shaped scan beam.

22. The position detection system as defined by claim 21, wherein the polygon mirror is configured so as not to reflect the first infrared laser beam and the second infrared laser beam simultaneously.

23. A game system comprising:

the position detection system as defined by claim 1;

a game processing section which performs processing based on a pointing position on the surface to be detected that has been calculated by the position detection system; and an image generation system which generates an image to be displayed on the surface to be detected, based on processing results of the game processing section, wherein the pointing device is configured as a shooting device which resembles a gun, and wherein the game processing section performs a shooting calculation or a hit-check calculation based on the pointing position on the surface to be detected that has been detected by the position detection system.

24. A control method for a position detection system which detects a pointing position of a pointing device on a surface to be detected; the control method comprising:

shining a line-shaped scan beam onto the surface to be detected, and scanning the line-shaped scan beam at a predetermined speed in two different directions on the surface to be detected;

detecting the line-shaped scan beam reflected from the surface to be detected; and calculating the pointing position on the surface to be detected, based on a time from start of scanning of the line-shaped scan beam that scans in a first direction of the surface to be detected until the light-receiving section detects the line-shaped scan beam, and a time from start of scanning of the line-shaped scan beam that scans in a second direction of the surface to be detected until the light-receiving section detects the line-shaped scan beam.

* * * * *